United States Patent Office 3,845,012
Patented Oct. 29, 1974

3,845,012

FLAME RETARDANT POLYMER COMPOSITIONS

Anthony C. Bernardo, Fort Lee, N.J., assignor to Allied Chemical Corporation, New York, N.Y.

No Drawing. Filed July 28, 1972, Ser. No. 276,183
Int. Cl. C08f *45/56, 45/62*
U.S. Cl. 260—45.75 B 5 Claims

ABSTRACT OF THE DISCLOSURE

Polymeric fire retardant compositions which exhibit good glow inhibiting and electrical insulative properties, which compositions comprise, approximately by weight, 40–65 percent, preferably 50–55 percent, of a polymer of an ethylenically unsaturated hydrocarbon, 23–40 percent, preferably 25–32 percent of a compound derived from polyhalogenated cyclopentadienes, 2–7 percent, preferably 4–5 percent of antimony oxide, 3–7 percent, preferably 4–5 percent of zinc borate and 5–14 percent, preferably 9–13 percent of talc. Preferably, the polymer comprises a polyolefin, more preferably polypropylene, and the compound derived from polyhalogenated cyclopentadienes is selected from the group consisting of:

(1) Compounds of the formulas

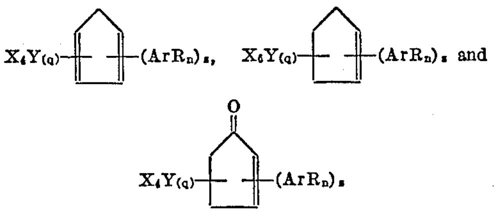

wherein *x* is halogen; Y is selected from the group consisting of halogen, alkyl and hydrogen; R is selected from the group consisting of chlorine, bromine, fluorine and trifluoromethyl; Ar is phenyl; *n* is from 1 to 2 when R is trifluoromethyl and *n* is from 2 to 4 when R is chlorine, bromine or fluorine; *z* is from 1 to 2, and *q* is from 0 to 1, *q* being zero when *z* is two;

(2) Compounds of the formula

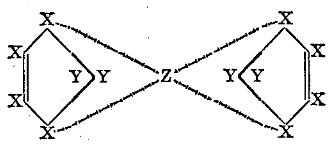

wherein X is halogen, Y is halogen, alkyl or alkoxy and Z is a tetravalent cyclic or acyclic hydrocarbon radical.

BACKGROUND OF THE INVENTION

Field of the Invention

This invention relates to novel fire retardant polymeric compositions.

Discussion of the Prior Art

It is known that the fire retardant properties of various polymeric materials may be enhanced by the addition of various halogenated organic compounds which are derived from polyhalogenated cyclopentadienes. Examples of such polyhalogenated cyclopentadiene derivatives are disclosed, for example, in the following U.S. Patents: 3,385,819, issued May 25, 1968 to Gouinlock; 3,396,201, issued Aug. 6, 1968 to Weil et al.; 3,450,768, issued June 17, 1969 to Gelfard and 3,519,597, issued July 7, 1970 to Weil et al.

The above-referred to fire retardant compounds are effective to impart fire retardance to various polymeric materials and the resultant polymeric compositions are normally self-extinguishing after contact with a flame. Many such polymeric compositions, however, particularly those containing polyolefins, may exhibit an incandescent afterglow which may continue for a period of time after extinction of the flame. Such afterglow presents a further fire hazard.

In addition, many fire retardant compositions when added to polymeric materials have been found to reduce desirable electrical insulative properties of the polymeric materials. This is particularly a problem in plastic compositions used in high voltage applications where electrical shorts can causes fires, such as in the television, aircraft and automotive industries.

SUMMARY OF THE INVENTION

In accordance with my invention, improved polymeric fire retardant compositions are provided which exhibit good glow suppressing and electrical insulative properties. Such compositions retain their electrical insulative, as well as fire retardant and glow suppressive, properties even after being subjected to high temperature and high humidity environments. These polymeric compositions comprise, approximately by weight, 40–65 percent, preferably 50–55 percent, of a polymer of an ethylenically unsaturated hydrocarbon, 23–40 percent, preferably 25–32 percent of a compound derived from polyhalogenated cyclopentadienes, 2–7 percent, preferably 4–5 percent of antimony oxide, 3–7 percent, preferably 4–5 percent of zinc borate and 5–14 percent, preferably 9–13 percent of talc. Preferably, the polymer comprises a polyolefin, more preferably polypropylene, and the compound derived from polyhalogenated cyclopentadienes is selected from the group consisting of:

(1) Compounds of the formulas

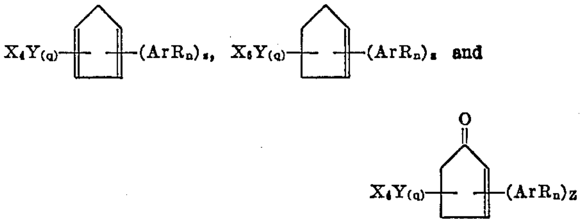

wherein X is halogen; Y is selected from the group consisting of halogen, alkyl and hydrogen; R is selected from the group consisting of chlorine, bromine, fluorine and trifluoromethyl; Ar is phenyl; *n* is from 1 to 2 when R is trifluoromethyl and *n* is from 2 to 4 when R is chlorine, bromine or fluorine; *z* is from 1 to 2, and *q* is from 0 to 1, *q* being zero when *z* is two;

(2) Compounds of the formula

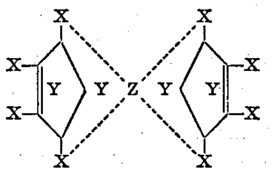

wherein X is halogen, Y is halogen, alkyl or alkoxy and Z is a tetravalent cyclic or acyclic hydrocarbon radical. In the above formulas, the alkyl and alkoxy radicals are preferably of 1 to 8 carbon atoms.

DESCRIPTION OF THE PREFERRED EMBODIMENT

The polymeric materials which are rendered fire retardant in accordance with this invention comprise polymers of an ethylenically unsaturated hydrocarbon. Among such polymers are the homopolymers and graft and block copolymers of unsaturated aliphatic, cycloaliphatic and aromatic hydrocarbons. Preferred polymers are the polyolefins, i.e., the homopolymers and graft and block copolymers of ethylene, propylene, butene, etc. Of these polyolefins, polypropylene is the most preferred.

The fire retardant compositions comprise about 40 to 65 percent by weight of the polymeric material, preferably about 50 to 55 percent by weight.

The compounds derived from polyhalogenated cyclopentadienes may comprise compounds of groups (1) and (2) as disclosed above. Compounds of group (1) are disclosed, for example, in the aforementioned U.S. Pat. 3,450,768, which is incorporated herein by reference. Compounds of group (2) are disclosed, for example in the aforementioned U.S. Pats. 3,385,819; 3,396,201 and 3,519,-597, which are incorporated herein by reference. The preferred polyhalogenated cyclopentadiene derivative compounds are Diels-Alder adducts of hexachlorocyclopentadiene and a polyunsaturated cycloaliphatic compound, more preferably having 4 to 6 carbon atoms in the cycloaliphatic ring.

The term "polyhalogenated cyclopentadiene derivative" as used herein is intended to include compounds including a five carbon atom member ring having at least one double bond and having a plurality of halogen substitution, which ring is bonded directly or indirectly through an acyclic hydrocarbon radical to a cyclic carbon ring.

Examples of specific polyhalogenated cyclopentadiene derivatives useful in this invention include: 2,4-dichlorophenyl pentachlorocyclopentadiene, 2,4 - dibromophenyl pentabromocyclopentadiene, 1,2,4 - trichlorophenyl pentachlorocyclopentadiene, 1,2,4-tribromophenyl pentabromocyclopentadiene, 1,2,4 - trichlorophenyl methyltetrachlorocyclopentadiene, di(tetrachlorophenyl) tetrachlorocyclopentadiene, and Diels-Alder adducts of hexachlorocyclopentadiene with 1,7 - octadiene, 1,9 - octadiene, 1,11-dodecadiene, 1,19 - eicosadiene, 1,5 - cyclooctadiene, cyclopentadiene, dicyclopentadiene, as well as hexabromocyclopentadiene adducts with the same compounds.

The polyhalogenated cyclopentadiene derivative is included in the flame retardant composition in an amount in the range of about 23 to 40 percent, preferably about 25 to 32 percent, by weight.

The compositions further include approximately by weight 2 to 7 percent, preferably 4 to 5 percent of antimony oxide; 3 to 7 percent, preferably 4 to 5 percent of zinc borate; and 5 to 14, preferably 9 to 13 percent of talc.

Minor amounts of commercially available polymer stabilizers and other conventional additives may be added to the composition. Typical of such stabilizers are distearyl thiodipropionate, dilauryl thiodiproprionate, dibutyl phosphite, didecyl phosphite, butylated hydroxy toluene, octadecyl 3-(3,5-di-tert-butyl-4 hydroxy phenyl) propionate, tetrakis[methylene 3 - (3',5' - di-tert-butyl - 4' - hydroxy phenyl)proprionate]methane, etc.

The components of the fire retardant compositions of this invention may be combined in any suitable manner. For example, the components may be dry-blended in the finely divided state so that intimate mixture is obtained. Alternatively, to the polymer in its molten state or in solution may be added the remaining components individually or as a preformed mixture.

The above compositions are flame retardant (self-extinguishing) and glow suppressant and retain these as well as their electrical insulative properties even after being subjected to high temperature and high humidity conditions. They may be processed by conventional procedures, such as molding (e.g., injection molding), extrusion, etc. The compositions find particular utility in applications which involve high temperatures or high voltages wherein the heat or electrical shorts can cause fires, such as in the television, aircraft and automotive industries.

By way of illustrating the present invention, the following specific examples are given.

EXAMPLE 1

Polypropylene fire retardant compositions are made by mixing granular polypropylene resin, a polyhalogenated cyclopentadiene derviative, antimony oxide, talc and zinc borate in the amounts specified in Table I. The components are mixed in a small Bambury mixer at 350° F. and the sample polymeric compositions are sheeted out onto cold rolls in a two roll mill, cut up, ground and thereafter injection molded at a temperature of about 400 to 450° F. into 5 x ½ inch sample bars of 1/16 inch, ⅛ inch and ¼ inch thickness.

TABLE I.—PREPARATION OF POLYMERIC COMPOSITIONS

| | Parts by weight | | |
|---|---|---|---|
| Sample | 1 | 2 | 3 |
| Component: | | | |
| Polypropylene | 55 | 50 | 50 |
| Dechlorane+515 [1] | 25 | 32 | 27 |
| Antimony oxide | 5 | 4 | 5 |
| Zinc borate | 5 | 5 | 5 |
| Talc | 10 | 9 | 13 |
| Stabilizers (conventional) | 0.8 | 0.8 | 0.8 |

[1] Dechlorane+515 is polyhalogenated cyclopentadiene derivative available from Hooker Chemical Corporation, having a chlorine content of 65 percent, a melting point in excess of 350° C., a density of 1.80 g./cc. and a vapor pressure at 200° C. of 0.006 mm. Hg.

Specimens of samples 1, 2 and 3 are subjected to flammability tests to determine flame and glow resistance in accordance with U.L. Bulletin 94. Specimen test rods are held in a vertical position while a ¾ inch flame from a Bunsen burner (technical grade methane gas) is held for 10 seconds under the lower end of the specimen. The sample is supported by a clamp from its upper ¼ inch and is spaced at a distance ⅜ inch above the top of the burner tube and 12 inches above a horizontal layer of surgical cotton. With the flame withdrawn duration of flaming of the specimen is noted. When flaming ceases, the test flame is again placed under the specimen. After 10 seconds, the test flame is again withdrawn and the duration of flaming and glowing is noted. It is also noted whether the specimen drip flaming particles which ignite the cotton. The test is repeated except that dry surgical cotton is applied to the glow after 10 seconds from the second removal of the test flame. It is noted whether the cotton ignites.

Specimens are classified SE–0 in accordance with U.L. Bulletin 94 if no specimens burn with flaming combustion for more than 10 seconds after each application of the flame, the total flaming combustion does not exceed 50 seconds for ten flame applications for each set of 5 specimens, no specimens burn up to the holding clamp, no specimens drip flaming particles which ignite the cotton, no specimens glow beyond 30 seconds after the second removal of the flame and no specimens glow beyond 10 seconds and ignite the cotton after second removal of the flame.

Samples 1, 2 and 3 are tested in the above-described manner and are classified SE–0.

Samples are again tested in the above-described manner after being subjected to temperature aging at 150° C. for 30 days and to humidity aging at 100 percent RH, 60° C. for 96 hours. The samples are classified SE–0.

Typical electrical properties of the samples as set forth in Table I are measured and the results are listed in Table II. The effects of humidity aging are also shown in the table.

TABLE II.—ELECTRICAL PROPERTIES

| Property | Value | ASTM method |
|---|---|---|
| Dielectric constant at 1 kHz and 100 kHz | 2.49 | D150 |
| Dissipation factor at 1 kHz and 100 kHz | .002 | D150 |
| Dielectric strength (volts/mil) | 600 | D149 |
| Aged 96 hours at 100% RH, 60° C. | 610 | D149 |
| Arc resistance (sec.) | 75 | D495 |
| Volume resistivity (ohm-cm.) | $1\times10^{14}$ | D257 |
| Aged at 100% RH, 60° C.: | | |
| 96 hours | $1\times10^{14}$ | D257 |
| 168 hours | $2\times10^{14}$ | D257 |
| 257 hours | $2\times10^{14}$ | D257 |
| Surface resistivity (ohms) | $2\times10^{14}$ | D257 |
| Aged 96 hours at 100% RH, 60° C. | $2\times10^{14}$ | D257 |

The electrical properties of specimens of Sample 3 having a thickness of 70±5 mils are measured for the effects of temperature aging. Results are shown in Table III.

TABLE III.—ELECTRICAL PROPERTIES AFTER TEMPERATURE AGING

| Property | Value | ASTM method |
|---|---|---|
| Dielectric strength (volts/mil): | | |
| Initial | 719 | D149 |
| Aged 30 days at 150° C. | 744 | D149 |
| Arc resistance (sec.): | | |
| Initial | 126 | D495 |
| Aged 30 days at 150° C. | 131 | D495 |

EXAMPLE 2

Example 1 is repeated utilizing as the polyhalogenated cyclopentadiene derivative a 2:1 Diels-Alder adduct of hexachlorocyclopentadiene and 1,5 cyclooctadiene. Similar flame resistance, glow resistance and electrical insulative properties are obtained.

EXAMPLE 3

Example 2 is repeated utilizing 1,2,4-tribromophenyl pentabromocyclopentadiene as the polyhalogenated cyclopentadiene derivative. Similar flame resistance, glow resistance and electrical insulative properties are obtained.

It will be apparent to those skilled in the art that many modifications and variations of the invention as hereinafter set forth may be made without departing from the spirit of the invention. It is also to be understood that the scope of the invention is not to be interpreted as limited to the specific embodiments disclosed herein, but only in accordance with the appended claims when read in the light of the foregoing disclosure.

I claim:

1. A fire retardant and glow suppressant polymeric composition consisting essentially of, in approximate percent by weight, (a) 40 to 65 percent of a polymer of an ethylenically unsaturated hydrocarbon selected from the group consisting of homopolymers and graft and block copolymers of ethylene, propylene and butene, (b) 23 to 40 percent of a polyhalogenated cyclopentadiene derivative selected from the group consisting of (1) compounds of the formulas

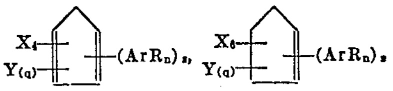

and

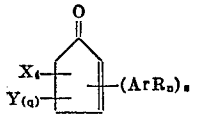

wherein X is halogen; Y is selected from the group consisting of halogen, alkyl and hydrogen; R is selected from the group consisting of chlorine, bromine, fluorine and trifluoromethyl; Ar is phenyl; *n* is from 1 to 2 when R is trifluoromethyl and *n* is from 2 to 4 when R is chlorine, bromine or fluorine; *z* is from 1 to 2, and *q* is from 0 to 1, *q* being zero when *z* is two;

(2) compounds of the formula

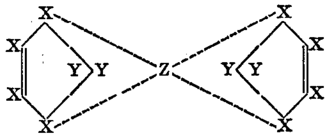

wherein X is halogen, Y is halogen, alkyl or alkoxy and Z is a tetravalent cyclic or acyclic hydrocarbon radical, (c) 2 to 7 percent of antimony oxide, (d) 3 to 7 percent of zinc borate and (e) 5 to 14 percent of talc.

2. A composition in accordance with claim 1 wherein said polymer is polypropylene.

3. A composition in accordance with claim 1 including 50 to 55 percent of said polymer, 25 to 32 percent of said polyhalogenated cyclopentadiene derivative, 4 to 5 percent of antimony oxide, 4 to 5 percent of zinc borate and 9 to 13 percent of talc.

4. A composition in accordance with claim 1 wherein said polyhalogenated cyclopentadiene derivative is a Diels-Alder adduct of hexachlorocyclopentadiene and a polyunsaturated cycloaliphatic compound.

5. A composition in accordance with claim 4 including 50 to 55 percent of polypropylene, 20 to 32 percent of Diels-Alder adduct of hexachlorocyclopentadiene and a polyunsaturated cycloaliphatic compound, 4 to 5 percent of antimony oxide, 4 to 5 percent of zinc borate and 9 to 13 percent of talc.

References Cited

UNITED STATES PATENTS

| | | | |
|---|---|---|---|
| 3,720,643 | 3/1973 | Abu-Isa et al. | 260—41.5 A |
| 3,396,201 | 8/1968 | Weil | 260—45.75 B |
| 3,415,938 | 12/1968 | Lewiston | 260—648 C |
| 3,560,441 | 2/1971 | Schwarcz | 260—45.75 B |

DONALD E. CZAJA, Primary Examiner

W. E. PARKER, Assistant Examiner

U.S. Cl. X.R.

260—45.7 R